United States Patent
Vanreyten et al.

(10) Patent No.: US 11,685,633 B2
(45) Date of Patent: Jun. 27, 2023

(54) BELT REINFORCED WITH STEEL STRANDS

(71) Applicant: BEKAERT ADVANCED CORDS AALTER NV, Aalter (BE)

(72) Inventors: Wouter Vanreyten, Tampere (FI); Gerd Morren, Vilvoorde (BE)

(73) Assignee: BEKAERT ADVANCED CORDS AALTER NV, Aalter (BE)

( * ) Notice: Subject to any disclaimer, the term of this patent is extended or adjusted under 35 U.S.C. 154(b) by 741 days.

(21) Appl. No.: 16/624,685

(22) PCT Filed: Jun. 25, 2018

(86) PCT No.: PCT/EP2018/066862
§ 371 (c)(1),
(2) Date: Dec. 19, 2019

(87) PCT Pub. No.: WO2019/002163
PCT Pub. Date: Jan. 3, 2019

(65) Prior Publication Data
US 2020/0122972 A1    Apr. 23, 2020

(30) Foreign Application Priority Data
Jun. 27, 2017    (EP) .................................... 17177995

(51) Int. Cl.
*B66B 7/06* (2006.01)
*D07B 1/06* (2006.01)
*F16G 1/12* (2006.01)

(52) U.S. Cl.
CPC ............ *B66B 7/062* (2013.01); *D07B 1/0633* (2013.01); *D07B 2201/2009* (2013.01);
(Continued)

(58) Field of Classification Search
CPC ....................................................... B65H 81/06
See application file for complete search history.

(56) References Cited

U.S. PATENT DOCUMENTS

| 3,358,435 A | 12/1967 | Peene |
| 4,829,760 A | 5/1989 | Dambre |

(Continued)

FOREIGN PATENT DOCUMENTS

| CN | 203638956 U | * 6/2014 | ........... D07B 1/0686 |
| DE | 2326742 A | * 12/1974 | ............. D07B 1/068 |

(Continued)

OTHER PUBLICATIONS

"Why is Galvanizing Important?" Metal Supermarkets. Oct. 8, 2014. https://www.metalsupermarkets.com/galvanizing-important/#:~:text=Galvanization%20is%20the%20process%20of,because%20of%20its%20special%20properties. (Year: 2014).*

(Continued)

*Primary Examiner* — Khoa D Huynh
*Assistant Examiner* — Grace Huang
(74) *Attorney, Agent, or Firm* — Wenderoth, Lind & Ponack, L.L.P.

(57) ABSTRACT

A belt for use as for example an elevator belt, flat belt, synchronous belt or toothed belt comprises steel strands held in parallel by a polymer jacket. The steel strands have a diameter 'D' and are separated by a pitch 'p'. The ratio of diameter 'D' over pitch 'p' is larger than 0.55. Such belt arrangement prevents the cutting of the polymer jacket between strand and pulley and abates the noise generation during use. The belts are best built with a type of parallel lay strands particularly designed for use in a belt. These strands do not show core migration during use of the belt.

14 Claims, 3 Drawing Sheets

(52) U.S. Cl.
CPC ............... *D07B 2201/2029* (2013.01); *D07B 2401/208* (2013.01); *D07B 2501/2007* (2013.01); *F16G 1/12* (2013.01)

(56) References Cited

U.S. PATENT DOCUMENTS

| | | | | |
|---|---|---|---|---|
| 6,295,799 | B1 * | 10/2001 | Baranda | D07B 1/0686 57/221 |
| 7,089,723 | B2 * | 8/2006 | Vanneste | B60C 9/005 57/212 |
| 7,272,921 | B2 * | 9/2007 | Misrachi | D07B 1/0673 57/210 |
| 8,789,658 | B2 * | 7/2014 | Goser | B66B 7/062 474/260 |
| 9,200,405 | B2 * | 12/2015 | Baekelandt | D07B 1/0666 |
| 10,160,600 | B2 * | 12/2018 | Hou | D03D 1/0094 |
| 10,662,582 | B2 * | 5/2020 | Belin | D07B 1/165 |
| 2002/0134482 | A1 * | 9/2002 | Takagi | B29C 48/05 152/532 |
| 2002/0153078 | A1 | 10/2002 | Cordonnier et al. | |
| 2007/0102183 | A1 * | 5/2007 | Jotti | B29C 48/335 174/68.1 |
| 2012/0175034 | A1 * | 7/2012 | Gauthier | D07B 1/0633 428/377 |

FOREIGN PATENT DOCUMENTS

| | | | |
|---|---|---|---|
| EP | 1 280 958 | 5/2005 | |
| EP | 1 555 233 | 7/2005 | |
| EP | 2055829 A1 * | 5/2009 | ............... B66B 7/06 |
| EP | 2 284 111 | 4/2013 | |
| EP | 2 366 047 | 3/2015 | |
| GB | 2 252 774 | 8/1992 | |
| JP | 5-186975 | 7/1993 | |
| JP | 2001336075 A * | 12/2001 | ........... D07B 1/0633 |
| JP | 2004-277968 | 10/2004 | |
| WO | 2005/043003 | 5/2005 | |
| WO | 2012/141710 | 10/2012 | |
| WO | 2014/063 900 | 5/2014 | |
| WO | WO-2014063900 A1 * | 5/2014 | ............. B66B 7/062 |

OTHER PUBLICATIONS

International Search Report dated Oct. 11, 2018 in International (PCT) Application No. PCT/EP2018/066862.

\* cited by examiner

BELT REINFORCED WITH STEEL STRANDS

TECHNICAL FIELD

The invention relates to a belt reinforced with steel strands. The belts are in particular synchronous belts or belts as used as tension members in elevators.

BACKGROUND ART

Belts are technical artefacts that are used for conveying material, transfer power, or positioning things by interacting with driven or non-driven pulleys. For example elevator belts are used to transport people in elevators, V-belts are used to transfer power, synchronous belts are well suited to accurately position grippers in machines and to transfer power. Belts generally comprise a strong reinforcement that may or may not be covered with a polymer in order to protect the reinforcement. In general a belt will have a non-circular cross section such as the trapezoidal cross section of a V-belt or the rectangular cross section of a flat belt.

The reinforcement of a belt must meet a plurality of requirements:

The reinforcement must not only be strong i.e. be able to withstand large longitudinal forces but . . .
it should also have a high modulus to prevent excessive elongation when tensioning the belt.
Furthermore the reinforcement should not creep or lengthen during its repeated running over pulleys.
The reinforcement must very flexible i.e. have a low bending stiffness in order to follow the curvature of the pulleys.
The reinforcement should have a long and predictable lifetime so as to ensure the long term functioning of the machine it is mounted in.
The reinforcement must unite with the polymer jacket i.e. the reinforcement must adhere or anchor to the polymer jacket. This is particularly important because all forces are transferred from the pulley through the jacket to the reinforcement.

The jacket's main functions are to protect the reinforcement, to transfer force between the pulley and the belt and to keep the reinforcement together. Generally the reinforcement capacity of the jacket is weak compared to that of the reinforcement itself.

The history of the reinforcement of belts is not different from the ones in other composite materials such as tyres or hoses. Initially natural fibres such as cotton or hemp was used, followed by man-made or man-altered fibres such as rayon, nylon, polyester, polypropylene, and other organic fibres. High tenacity fibres such as ultra-high-molecular weight polyethylene (Dyneema®) or aromatic polyamides (Kevlar®) or poly(p-phenylene-2,6-benzobisoxazole (PBO, Zylon®) based fibres have also been considered but do not always make it to the market as not being fatigue proof or having too much creep or being difficult to adhere to a polymer jacket. Glass fibre and carbon fibre reinforced belts are being offered but mainly for high end applications. So still a large part of belts is reinforced with steel cords.

The steel cords used for the reinforcement of belts are almost exclusively of the multi strand type. Such cord is built up of 'm' single steel filaments that are twisted into strands after which 'n' strands are twisted into an 'n×m' cord. Popular constructions are 3×3 i.e. three filaments are twisted together into a strand after which three of such strands are twisted into a cord. Other examples are 7×7, or 7×3 strands. While these constructions were mainly used in synchronous belts, they are now also widely used in flat belts for elevators (EP 2284111 B1). While these types of constructions have fairly good elongation properties (when following the teaching of WO2005/043003), very good jacket anchoring, very low creep and an excellent fatigue life their modulus is somewhat low.

Attempts to replace these types of multistrand cords by other types of cords for use in belts are numerous:

There is GB2252774 wherein layered strands having a central core of one or more filaments surrounded by at least one layer of filaments are suggested for use in synchronous belts;

There is WO 2012/141710 wherein an elevator belt is described wherein the reinforcing cords comprise a plurality of steel filaments that are free of 'second order' helical structure i.e. are strands;

There is EP 1555233 A1 wherein the first embodiment describes an elevator belt with seven strands that are of the Warrington type.

However, when confronting these 'solutions' with reality they fail. The main obstacle remains the central core filament or filaments that under the repeated load cycle of tension and compression wicks out of the cord. The pulley driving the belt puts the belt under tension in the movement towards that pulley. The pulley driven by the belt may put the belt under compression in the return. These repetitive pull-pull cycles induce a 'peristaltic' action on the core of the strand that ultimately leads to the moving out of the core. The movement is always in the 'forward' direction i.e. in the direction of the belt movement. The wicking of the core may lead to the core penetrating the polymer jacket and entangling with one of the pulleys leading to a complete collapse of the belt. This is the 'core migration problem'.

A further problem that may occur when using belts is the generation of noise when belts are running at moderate speeds for example in the case of elevator belts. This noise is perceived as annoying by the travellers in the elevator and therefore one seeks to avoid it.

DISCLOSURE OF INVENTION

The main object of the invention is to provide a belt that does not show the problems of the prior art. In particular a solution is suggested to also avoid the core migration problem. Additionally a solution is sought for the noise problem. Further objectives of the invention are to provide a belt that has a high strength over width ratio and shows a good adhesion and/or anchoring between the reinforcement and the polymer jacket.

According a first aspect of the invention a belt according the features of claim 1 is claimed.

The belt that is subject of the invention comprises a plurality of steel strands and a polymer jacket. A length dimension, a width dimension and a thickness dimension can readily established for any belt in that the length dimension is the largest, followed by the width dimension and the thickness dimension being the smallest. Each of the steel strands has steel strand diameter designed 'D' (in mm) in what follows. Each steel strand also has a steel strand centre that is the centre of a circle tangentially circumscribing a perpendicular cross section of the strand. The steel strands are oriented along the length dimension and are held in a parallel relationship to one another by the polymer jacket. All steel strand centres are aligned, are on a line in the width dimension i.e. the centres are in a surface spanned by the local width and length dimension. Neighbouring steel strand centres are separated by a pitch—hereinafter referenced with 'p' (in mm).

For the purpose of this application the pitch 'p' is the distance along the width dimension between the two outer strand centres divided by the number of strands minus one. It is no prerequisite of the invention—although it is preferred—that the distance between neighbouring steel strand centres are equal. Alternatively worded: the pitch corresponds to the average of the centre to centre distances between steel strands in a perpendicular cross section of the belt. In a preferred embodiment, the distance between neighbouring steel strand centres are equal.

The belt is characterised in that ratio of the steel strand diameter to the pitch—i.e. D/p—is larger than 0.55. This ratio is indicative for how much of the width of the belt at the level of the centres of the steel strands is actually occupied by steel.

In particular and preferred embodiments the belt can be:
An elevator hoisting belt. Such a belt can have a rectangular cross section i.e. the sides contacting the pulleys are flat i.e. the elevator hoisting belt is a 'flat belt'.
Alternatively the elevator belt may be provided with grooves along the length of the belt at one side or on both sides: a 'grooved belt'. The grooves engage with circumferential grooves in the pulleys contacted by the belt.
Alternatively the belt can be in the form of a synchronous belt i.e. a belt that is provided with toothing substantially perpendicular to the length of the belt. The toothing engages with a toothed pulley contacting the belt. This is also called a toothed belt.

In this description whenever reference is made to a 'belt' any of the belts mentioned may be provided with a reinforcement in the manner described hereinafter. Consequently, the word 'belt' may be substituted with the more specific wordings 'elevator belt', 'synchronous belt', 'flat belt' or 'grooved belt' anywhere in the text. However, the described belt is most suitable for an elevator belt.

For the purpose of this application the thickness of the belt is the minimum caliper size. The 'caliper size' measured in a certain direction in a plane perpendicular to the length dimension of the elevator belt is the distance between two parallel anvils of a Vernier caliper that touch the belt. By determining the caliper size for any direction one can determine the minimum caliper size. The width is then the caliper size measured orthogonal to the direction wherein the thickness is measured. Typically the ratio of width over thickness will be larger than 3 but smaller than 25, for example between 4 and 20, preferable between 6 and 12.

With a 'plurality' of steel strands is meant a number that may vary from 2 to 30 for example from 4 to 25, or between 4 to 16 e.g. 12. The number is chosen as a function of the total needed strength of the belt that on its turn is dictated by the use of the belt. For example for an elevator belt the number of steel strands will depend from the nominal load capacity of the elevator, the reeving ratio, the number of elevator belts and the safety factor. For a synchronous belt the number of steel strands will be determined by the power that is intended to be carried over.

A 'steel strand' comprises steel filaments that are twisted together. A 'steel strand' may comprise a core that may be straight ('zero order helix deformation') and steel filaments that are formed in the shape of a helix ('first order helix deformation') that surround the core. This is in contrast with multistrand cords wherein also steel filaments are present that show a helix of which the axis of the helix also has the shape of a helix ('second order helix deformation'). The outer filaments of the outer strands of a 7×7 construction show such a 'second order helix deformation'. A 'steel strand' can thus be conveniently defined as a cord having steel filaments with zero order and/or first order helix deformation but no filaments with higher order helix deformation.

The diameter D of the steel strands may vary between 0.5 mm and 6 mm depending on the use of the belt. Common sizes are between 1.2 mm and 2 mm. Preferably all steel strands in the belt have the same diameter. In order to preserve flexibility of the belt, the steel filaments used should have a diameter of between 0.02 mm to 0.40 mm, more preferred between 0.04 and 0.25 mm or between 0.10 and 0.20 mm. Preferably the filaments have a round cross section as these type of filaments can be made with high tensile strength. The more filaments that are present in the steel strand of a certain diameter 'D', the more flexible the steel strand becomes as the diameter of the filaments must of course concurrently decrease. Typically there are between 15 and 60 filaments or more preferred between 19 and 57 filaments e.g. between 21 and 39 filaments in a steel strand.

With 'steel' any type of steel is meant. Plain carbon steel is preferably used. Such a steel generally comprises a minimum carbon content of 0.40 wt % C or at least 0.70 wt % C but most preferably at least 0.80 wt % C with a maximum of 1.1 wt % C, a manganese content ranging from 0.10 to 0.90 wt % Mn, the sulfur and phosphorous contents are each preferably kept below 0.03 wt %; additional microalloying elements such as chromium (up to 0.2 to 0.4 wt %), boron, cobalt, nickel, vanadium—a non-exhaustive enumeration—may also be added. Such carbon steel filaments can be produced at strengths in excess of 2000 MPa, preferably above 2700 MPa, while now strengths above 3000 MPa are becoming current and inroads are being made for strengths over 3500 MPa. Also preferred are stainless steels. Stainless steels contain a minimum of 12 wt % Cr and a substantial amount of nickel. More preferred are austenitic stainless steels, which lend themselves more to cold forming. The most preferred compositions are known in the art as AISI (American Iron and Steel Institute) 302, AISI 301, AISI 304 and AISI 316 or duplex stainless steels known under EN 1.4462.

The polymer jacket is encasing, surrounding, holding the steel strands in position. Practical usable polymers are thermohardening polymers like rubber and thermoplastic polymers, the latter being preferred for their ease of processing and the possibility to easily alter the mechanical properties of the polymer. Most preferred thermoplastic materials are thermoplastic polyurethane (TPU) and thermoplastic polyolefins (TPO).

TPUs derived from a poly ether polyol resist hydrolysis well but have lower mechanical properties. TPUs derived from a poly ester polyol have better mechanical properties but are less resistant to hydrolysis. The resistance to hydrolysis and the mechanical properties of TPU derived from poly carbonates are in between both other types. Most preferred are poly ether polyol based TPU and poly carbonate polyol based TPUs.

Now coming back to the characterising portion of the main claim: a ratio D/p equal or lower than 0.55 will result in steel strand that will cut through the polymer jacket. Indeed, steel strands—in comparison to the well-known multistrand steel cords—have a higher axial stiffness in combination with a lower diameter. When now the belt is running over a pulley the local pressure under the steel strand on the polymer will be higher than in the case of a multistrand rope as the steel strand elongates less and has a lower diameter. Hence, there is the risk that steel strands cut through the polymer jacket.

Also, when the pitch between steel strands is large i.e. for D/p ratios lower than 0.55, the inventors suspect there is a risk for air entrapment between the polymer between the steel strands and the pulley. This could be a possible source of unwanted noise.

Hence, the ratio D/p is preferably larger than 0.55, or larger than 0.60, or larger than 0.625, at the most larger than 0.70.

The ratio D/p is preferably lower than 0.90 for example less than 0.80 such as lower than 0.70 for example lower than 0.625. When the ratio D/p is higher than 0.90 the part of the polymer jacket that is at the one side of the plane formed by the parallel steel strands may separate from the polymer jacket part at the other side. The reason for that is that the polymer area per unit length and per pitch (equal to 1−(D/p)) connecting the one side part to the other side part of the polymer jacket becomes too small and the polymer will be torn at those zones due the repeated bending. In conclusion: preferably the ratio D/p is between 0.55 and 0.625, for example is 0.60.

In order to mitigate this risk for separation of the one side part from the other side part of the polymer jacket the provision of an organic primer on the steel strands that promotes adhesion between the steel strands and the polymer of the polymer jacket is preferred. As both sides parts now also adhere to the steel strand an additional bridge between the one side part and the other side part is established. Hence, belts wherein the steel strands adhere to the polymer have an increased fatigue life.

It is to be noted that it suffices that the steel strand as a whole can be coated with an organic coating or primer i.e. it is not needed that individual steel filaments are coated with an organic coating or primer. In other words: only the outer surface of the steel strand must be provided with an adhesive as for example explained in the application EP2366047.

The primer is chosen to improve adhesion to the polymer wherein the reinforcement strand is intended to be used. Typical organic primers are phenolic resin, epoxy, cyanoacrylate, or acrylic based such as for example those marketed under the brand name Loctite®.

However, these coatings are relatively thick (more than one micrometer) and may require quite some processing time to apply. Therefore a nanoscopic organic coating taken out of the group comprising or consisting of organo functional silanes, organo functional zirconates and organo functional titanates are preferred. Preferably, but not exclusively, the organo functional silane primers are selected from the compounds of the following formula:

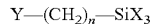

Y—(CH$_2$)$_n$—SiX$_3$ wherein:

Y represents an organo functional group selected from —NH$_2$, CH$_2$=CH—, CH$_2$=C(CH$_3$)COO—, 2,3-epoxypropoxy, HS— and, Cl—

X represents a silicon functional group selected from —OR, —OC(=O)R', —Cl wherein R and R' are independently selected from C1 to C4 alkyl, preferably —CH$_3$, and —C$_2$H$_5$; and n is an integer between 0 and 10, preferably from 0 to 10 and most preferably from 0 to 3

The organo functional silanes described above are commercially available products. These primers are particularly suited to obtain adhesion with polyurethanes. The organic coating has a thickness of less than 1 micrometer, preferably less than 500 nanometer, such as between 5 and 200 nm. Thin coatings of this size are preferred as they follow the outer surface of the steel strand in a conformal way and do not obstruct the filling of the polymer in the valleys between the outer layer filaments thanks to their thinness.

The reason why an organic primer is much preferred in the belt with steel strands according the current invention is that compared to prior art steel cord reinforcements like 7×7 steel strands have a smoother surface and hence the mechanical anchoring of the polymer in the steel strand is considerably lower which has to be compensated by chemical adhesion.

The adhesion force is measured as follows:
the steel strands are freed from the polymer at one end of the belt;
At that side, inside the belt one strand is cut at a distance 'L' mm from the polymer end (no extremal reinforcement strands are to be used for adhesion testing);
The maximum force in newton that is needed to pull the one strand axially out of the belt is determined;
This maximum force is divided by the embedment length 'L' in order to obtain the adhesion force per unit length;
The embedment length 'L' is a multiple of 12.5 mm such that the cord does not break when it is pulled out of the belt.

According the experience of the inventors the adhesion force per unit length (in N/mm) must be at least 20 times the diameter of the steel strand in mm. More preferred is if it larger than 30 times the diameter of the steel strand in mm.

In a particularly preferred embodiment the steel strands of the belt comprise a core having a core diameter and steel filaments that are organised around the core in the following way:

An intermediate layer comprising or consisting of N first steel filaments that are circumferentially arranged around the core. These N first steel filaments all have a first diameter. The core diameter and the first filament diameter are such that a gap forms between the first filaments in the intermediate layer. The gap is to be taken between the surface of adjacent filaments at their point of closest approach i.e. in the direction perpendicular to the surface of the filament.

An outer layer comprising or consisting of two times N i.e. 2N steel filaments that are likewise circumferentially arranged around the intermediate layer.

All the steel filaments of the intermediate layer and the outer layer are twisted around the core with the same final lay length (shortened to 'FL' hereinafter) and direction. With the 'final lay length and direction' is meant the lay length and direction when the strand is at rest i.e. when no outer moments or forces are acting on it for example the lay length as observed on a short piece of strand of about a meter.

Hence the steel strand is a parallel lay strand—also called an 'equal lay strand'—i.e. a strand that contains at least two layers of filaments, all of which are laid in the same direction with the same lay length in one operation. All filaments have a first order helical deformation. The core may have zero order helical deformation or comprise filaments of zero or first order helical deformation.

The steel strand is particular in that the final lay length by which the steel filaments are laid together is larger than two times and smaller than six times the closing lay length. The closing lay length—shortened to CL—is that limit lay length at which the gap between adjacent filaments of the intermediate layer is closed i.e. the filaments contact one another. Hence characteristic about the steel strand is that the final lay length FL is between 2×CL and 6×CL, limits included. Other ranges for the final lay length FL in comparison to the closing lay length CL are:

$$3 \times CL \leq FL \leq 6 \times CL \text{ or}$$

$$3 \times CL \leq FL \leq 5 \times CL \text{ or}$$

$$4 \times CL \leq FL \leq 6 \times CL \text{ or}$$

$$4 \times CL \leq FL \leq 5 \times CL.$$

Indeed when shortening the lay length of the steel strand, the filaments of the intermediate layer will tend to come closer together until they touch one another at the closing lay length. It is limiting in that when applying an even shorter lay length, the intermediate layer filaments will collide against one another and radially expand such that the core is no longer in contact with the intermediate layer filaments.

The closing lay length is determined by the core diameter '$d_0$', the first diameter '$d_1$' of the intermediate layer filament and 'N' the number of filaments in the intermediate layer. For all practical purposes in this application it is equal to:

$$CL = \frac{\pi(d_0 + d_1)}{\sqrt{\tan^2(\pi/N)\left[\left(\frac{d_0 + d_1}{d_1}\right)^2 - 1\right] - 1}} \quad \{1\}$$

For completeness one can define a first circumscribing circle having a first radius that is tangent to all first steel filaments. This first circumscribing circle has a radius of $(d_0/2)+d_1$.

Preferably for the steel strand according the invention, the final lay length is about 8 to 15 times the diameter D of the steel strand, or more preferable between 9 and 12 times the diameter D of the reinforcement strand.

The advantage of choosing this final lay length is that when the reinforcement strand comes under compression, the filaments still have the space to buckle within the intermediate layer. If the lay length is shorter than 2×CL there is no sufficient gap between the first steel filaments and they will be pushed out of the intermediate layer when under compression. As a result they wick out of the steel strand under repeated pull-pull action and ultimately wick out of the belt.

When the final lay length FL becomes larger than 6 times the closing lay length, the steel strand loses coherence and the strand may suffer ovalisation during use. Ovalisation is the phenomenon wherein a strand assumes an oval rather than a round cross section in the belt when being subjected to repeated bending over a pulley. Further the steel strands becomes prone to the movement of filaments between layers during use. As a result filaments of the intermediate layer may switch position with filaments of the outer layer which is called 'inversion'. Inversion of filaments may lead to local fatigue sensitive spots.

A further advantage is that when the final lay length is chosen as specified the filaments in the intermediate layer can be set under tension when the reinforcement strand is at rest. So if a first filament fracture would occur—for example due to repeated bending of the belt—the first filament fracture ends will move away from one another and the fracture ends will be held between the core and outer layer filaments. Hence, they do not come out of the steel strand and remain within the strand. As a result they will not wick out of the belt.

According a further preferred embodiment the diameters of the outer layer filaments are such that no gap forms between those filaments when the cord is at final lay length. With 'no gap' is meant that the gap is smaller than or equal to 1% or better even less than 0.5% of the diameter of the reinforcement strand.

It is better that no gaps are present in the outer layer as this prevents the inversion of filaments between intermediate layer and outer layer.

According another embodiment of the belt with the steel strands as detailed above the outer layer of the steel strand comprises N second steel filaments of a second diameter '$d_2$'. As the second steel filaments are organized circumferentially around the intermediate layer, have the same lay direction, the same final lay length and are in the same number as the intermediate layer filaments, they will nest in the valleys formed by the first filaments. A second circumscribing circle having a second radius that is tangent to all N second steel filaments can be defined.

N third steel filaments of a third diameter '$d_3$' that is smaller than the second diameter '$d_2$'. These filaments nest between the second steel filaments and are tangent to a third circumscribing circle having a third radius;

In a first version of this embodiment, the second radius touching the second steel filaments is equal to the third radius touching the third steel filaments. With 'equal' is meant that the absolute difference if the second and third radius divided by the largest of second and third radius is equal or smaller than 2%.

In more preferred version of this embodiment the second radius touching the second steel filaments is different from the third radius touching the third steel filaments. With 'different' is meant that the absolute difference of the second and third radius divided by the largest of second and third radius is larger than 2%, preferably is larger than 4%.

According a further preferred embodiment the second radius is larger than the third radius. That is: the second diameter is so large that the second filaments protrude out of the third circumscribing circle. The difference between second and third radius should at least be 2% of second radius. Even more preferred is if the difference is larger than 3% or even larger than 5%. A larger difference results in a less smooth surface of the reinforcement strand thereby enabling a better anchoring of the reinforcement strand in the polymer. Also the probability that filaments of the intermediate layer would invert with filaments of the outer layer is reduced. A less round steel strand is also easier to process as it will roll less during processing.

At first sight the steel strand might be catalogued as a Warrington type of construction. However, it is deviating from a Warrington in some important aspects:

The intermediate layer shows gaps at final lay length;
The 2N filaments of the outer layer filaments are tangent to two different circles, not one as in the case of a Warrington construction.

Advantageously the reinforcement strand according the invention still has the same merits as that of a Warrington construction in that:

The contacts between the filaments are line contacts, not point contacts. This has a positive influence on the fatigue life and on the cabling factor of the steel strand. The cabling factor is the ratio of the breaking load obtained on the steel strand to the sum of the breaking loads of the filaments prior to twisting them together. All this results in a belt with a favorable life time.

A major portion of the cross section of the steel strand is occupied by metal. The metal section—also called 'fill factor'—of the steel strand compared to the area of the largest circumscribing circle is at least 70% or higher. This is somewhat lower than a Warrington strand—wherein a fill factor of 80% is easily obtained—but still sufficient for the purpose. A large fill factor allows for a high breaking load within a limited circumscribed area. Further it has a positive influence on the axial stiffness of the steel strand in particular in its working region that typically is between 2 and 10% of the minimum breaking load of the reinforcement.

The steel strand has a higher modulus than a multi strand cord. Typically for a multi strand cord this is below 175 000 N/mm$^2$ while for a steel strand this is above this number, for example above 175 000 N/mm$^2$, or even above 180 000 N/mm$^2$. The modulus is to be determined in the linear region of the load—elongation curve i.e. at loads higher than 10% of the minimum breaking load.

According a further preferred embodiment of the belt, the number N of filaments in the intermediate layer of the steel strands is equal to 5, 6, 7, 8 or 9. Higher numbers of filaments N, for example 8 or 9, have the disadvantage that the core must be much larger than the other filaments which is not a preferred situation in terms of fatigue or migration. The ratio of core diameter to third diameter becomes 2.26 (N=8) to 2.9 (N=9). On the other hand for a small number of filaments—such as 5—the core becomes small and the ratio of core diameter to third diameter becomes 1.75 which is considered better. A smaller deviation in diameter between filaments is better than a large deviation as it improves the strength distribution between filaments. Most preferred are N=6 (ratio 1.3) and N=7 (ratio 1.71).

The core of the steel strand as incorporated into the belt is an important part of the steel strand as it is this part that tends to wick out during use of the belt. In what follows different possible core structures will be described:

In a further preferred embodiment of the belt, the core of the steel strands is a single steel filament. For example the core can be a round, straight filament made of a high tensile steel. This is least preferred.

In an alternative embodiment the core of the steel strands in the belt is a single steel filament comprising bends with straight segments in between. By this is meant that the core steel filament is not straight and has minute bends in it. The diameter of the core 'do' is now the diameter of the cylinder circumscribing the core and in touch with the bends.

The advantage of having a core that is a single steel filament comprising bends with straight segments in between is that the bends provide the core with places for preferred buckling. If—during the use of the belt—the core of the steel strands would become compressed, the bends will first yield and allow the core wire to reduce its axial length in a controlled way. If the bends would not be present, the straight wire will accumulate the compression over a much longer distance to the point that the core steel filament may even be pushed outside of the steel strand and out of the belt.

An alternative way to obtain a compression resistant core is to avoid the presence of a zero order helical deformed filament—i.e. a straight filament—altogether.

One way to avoid the presence of a single straight filament in the core is to provide the core as a strand comprising two or three or four core steel filaments. Most preferred are two or three, for example three core steel filaments. These core steel filaments are twisted together with a core lay length that is different from the final lay length FL of the steel strand. Preferably the core lay length is shorter than FL for example half of FL. The core lay direction can be opposite to the lay direction of the reinforcement strand, but the same lay direction is more preferred. Due to the stranding of the two, three or four core steel filaments, they can better sustain compression as the wires have a helical deformation.

Also preferred are equal lay constructions for the core that have no zero order helix deformation filament i.e. have no straight wire throughout the core. In a much preferred embodiment the core is a 12 wire semi-Warrington strand comprising a core-core existing of 3 filaments twisted together. A 'core-core' is 'the core of a core strand'. In the recesses formed by the filaments 3 larger outer filaments are nested. In between each pair of the 3 larger outer filaments a pair of smaller filaments is positioned. An example is given in U.S. Pat. No. 4,829,760 herewith incorporated in its entirety by reference. Another equally well preferred embodiment is a 9 wire semi-Warrington construction comprising a core-core of 3 fine wires and a jacket of six wires of alternating medium and large size. Such a cord is described in U.S. Pat. No. 3,358,435.

Alternatively, in a further preferred embodiment the core can be a strand comprising a core-core and 5, 6 or 7 core outer filaments. The core outer steel filaments are twisted around the core-core with a core lay length that is different from the final lay length of the reinforcement strand. By preference the core lay length is smaller than the final lay length FL of the reinforcement strand. The core lay direction can be opposite to the lay direction of the reinforcement strand, but the same lay direction is preferred. In an alternative embodiment, the core-core can be a straight single steel wire or can be a single steel wire having bends with straight segments in between. The core-core can sustain compression better as it is a very fine diameter and/or is provided with bends. Alternatively the core-core can again be a strand for example a 3×1 strand surrounded by 5, 6 or 7 core outer steel filaments twisted around the core-core.

In an alternative embodiment Warrington constructions can be considered for the core such as a 16 Warrington type (1+5+5|5), 19 Warrington type (1+6+6|6) or even 22 Warrington type (1+7+7|7) as they are known in the art. Even more preferred is that the core deviates from the Warrington type construction in the same way as described previously in that a second closing lay length exists that is between two and six times the second final lay length of the intermediate lay length of the core.

In a still further embodiment the core can on itself be of a layered cord such as 1+6+12 or 3+9+15 wherein each successive layer of filaments is twisted around the core or the intermediately formed strand with a different lay length but preferably with the same lay direction as that of the reinforcement strand.

In all preferred embodiments the steel filaments are provided with a metallic coating or metallic coating alloy. Such alloy can be used to impart corrosion protection to the steel or to make the filaments adhere to a polymer or to combine both: corrosion protection and adhesion. Corrosion resistant coatings are e.g. zinc or a zinc aluminum alloy. Most preferred is a low zinc, hot dip coating as described in EP 1280958. Such zinc coating has a thickness lower than two micrometer, preferably lower than one micrometer, e.g. 0.5 µm. An alloy layer zinc-iron is present between the zinc coating and the steel.

Preferred metallic adhesion enabling coatings are for example brass coatings—copper-zinc alloys—when the steel strand is for reinforcing rubber belts. So called 'ternary brass' such as copper-zinc-nickel (e.g. 64% by weight/35.5 wt. %/0.5 wt. %) and copper-zinc-cobalt (e.g. 64 wt. %/35.7 wt. %/0.3 wt. %), or a copper free adhesion system such as zinc-nickel or zinc-cobalt can also be used.

The described belt allows for a higher strength per unit width than prior art belts. This is due to the following reasons:
- (a) As the diameter of the strands is less compared to that of prior art multi-strand cords with the same breaking load, the overall width and thickness of the elevator belt can be reduced for the same strength;
- (b) As the reinforcement strand has a higher cabling factor a higher breaking load can be obtained with the same metallic area compared to a multi strand cord like a 7×7 cord;
- (c) As there are line contacts in between the filaments of the reinforcement strand higher tensile strength filaments (above 3500 N/mm$^2$) can be used with lower loss of the sum of the breaking load of the filaments compared to multi strand cords;
- (d) The modulus of the reinforcement strand is higher than that of prior art multi-strand cords.
- (e) As the D/p ratio is higher than 0.55, more steel strands can be accommodated within the same width. As a result, the belt is not only stronger but also has a higher axial stiffness within its working region compared to a prior art belt with multistrand steel cords and/or with a lower D/p ratio of the same width.

In conclusion: when compared to a prior art belt reinforced with a multi strand steel cord, the inventive belt reinforced with steel strands having the same total metallic cross sectional area i.e. having the same amount of steel in the belt will show:
- A smaller width for the at least the same strength (due to (a));
- A higher breaking load for the same weight of reinforcement (due to (b) and (c));
- A higher axial stiffness for the same weight (due to (d)).

For example in the case of an elevator belt, the item (e) will result in an elevator that will lower less when stepping into it. The elevator feel is also more 'solid' when stepping in the cabin compared to prior art elevators whereof the stepping in is more 'springy'.

BRIEF DESCRIPTION OF FIGURES IN THE DRAWINGS

In the figures like elements over various embodiments carry the same unit and tens digit. The hundred digit refers to the number of the figure.

MODE(S) FOR CARRYING OUT THE INVENTION

When reducing the invention to practice account has to be taken of the following limitations:
- The arrangement of the steel strands in the belt is to be determined on a perpendicular cross section of the belt, perpendicular meaning perpendicular to the length dimension of the belt;
- The arrangement of the filaments is determined on a cross section of the belt.
- A 'construction' of a steel cord comprising steel filaments is solely determined by the filament diameters, lay lengths and how the filaments are arranged in a cross section;
- The diameter of steel filaments can be measured up to the micrometer (μm). The diameter of a round filament is the average of the largest and smallest calliper diameter. Filaments whereof the difference between the largest and the smallest calliper diameter is below 7 μm are considered 'round';
- The tolerance on the diameters of the steel filaments is set to −4 to +4 micrometer (μm) from the nominal diameter. Hence, two filaments that show a difference in diameter that is smaller 8 μm (8 μm not included) will be treated as having the same diameter;
- The tolerance on lay lengths is between −5% to +5% of the nominal value. Lay length is determined as per the 'Internationally agreed methods for testing steel tyre cord', Chapter E4 'Determination of Length and Direction of Lay' as published by BISFA, "The International Bureau for the Standardisation of Man-made Fibres".
- The closing lay length is calculated as per the formula {1} based on the measured diameters of the core and the diameter and number of intermediate layer filaments.

Figure 1:
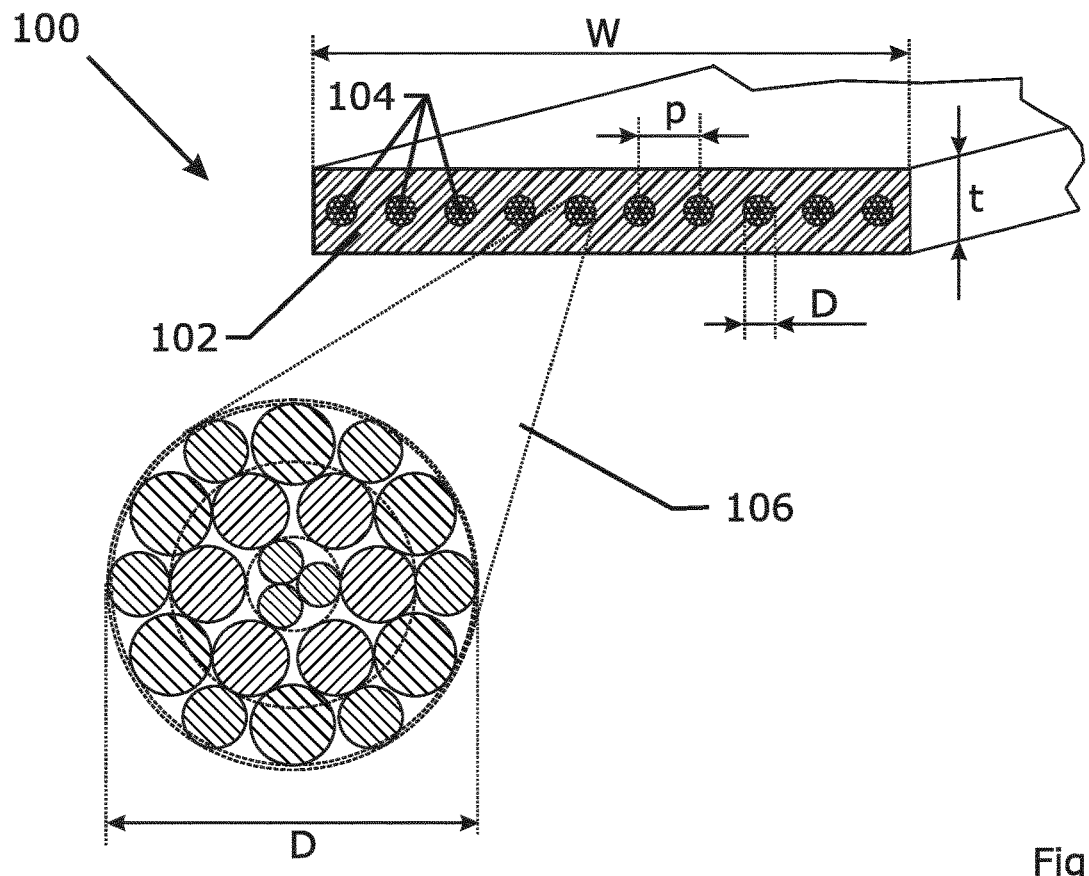
FIG. 1 shows a cross section of the inventive elevator belt with the steel strands.

FIG. 1 shows a perpendicular cross section of the inventive belt 100 showing the main features of the belt. The thickness 't' is the smallest dimension of the belt. Perpendicular to the thickness T and the length dimension is the width 'W' of the belt. A number of steel strands 104—in this case 10—are embedded in a polymer jacket 102. The steel strands have an indicated diameter 'D' and the centres of the steel strands are separated by a pitch 'p'. The lens 106 shows the steel strand dW21 as further explained in FIG. 2.

Such a belt is made by the techniques known in the art such as extrusion of parallel arranged steel strands through a single extrusion head or by laminating parallel unwound steel strands in between two sheets, the former method being more preferred over the latter method.

Figure 2:
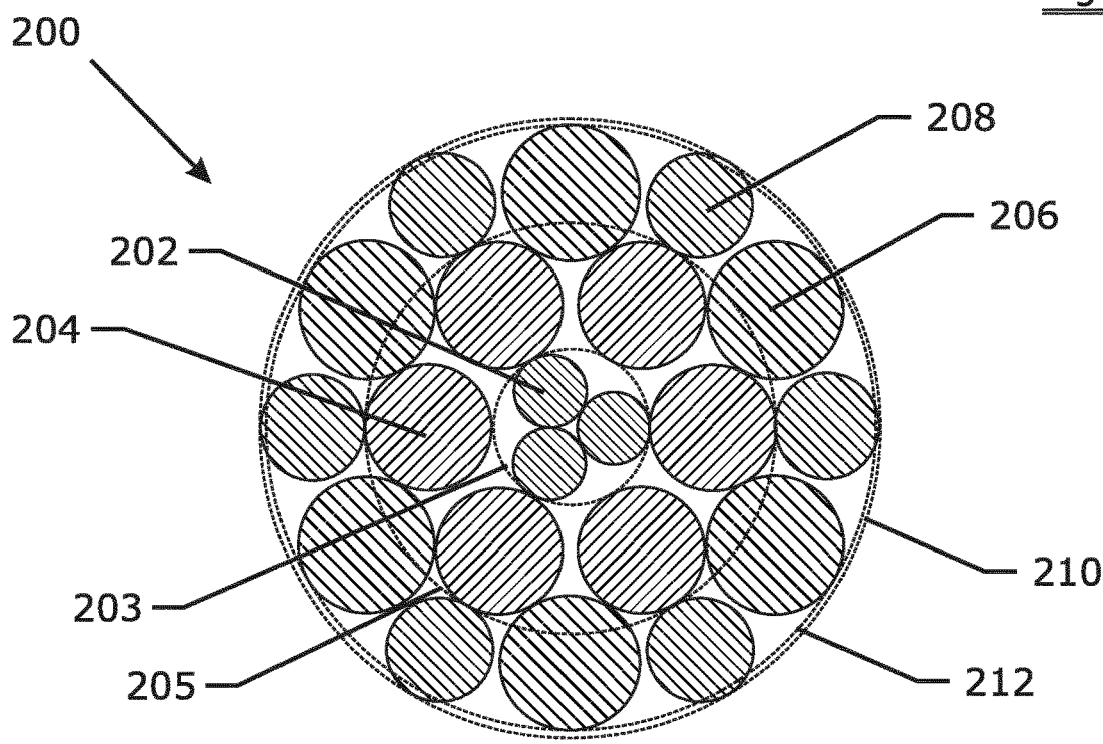
FIG. 2 shows the cross section of a preferred steel strand of the type 3+6+6|6 at final lay length that is particularly preferred to reinforce the inventive belt.

FIG. 2 shows a steel strand 200 ('dW21') particularly suited for use in the inventive belt. It has a core 203 that comprises three filaments 202 of size 120 μm diameter twisted together at a lay of 3.8 mm in Z direction. The core 203 has thus a diameter 'do' of 259 μm. The intermediate layer steel filaments 204 have a first diameter of 210 μm. The number N has been set to 6. The intermediate layer is surrounded by an outer layer consisting of 12 steel filaments: 6 second steel filaments 206 and 6 third steel filaments 208. The second diameter is 223 μm. The third diameter is 170 μm. The first radius 205 is 130 μm. The second radius 212 is 500 μm, the third radius 210 is 510 μm. The first, second and third radius can be calculated by simple trigonometry from the measured filament sizes and/or from a cross section. The gap between the filaments of the outer layer at final lay length is 11 μm. The diameter of the strand is 1.02 mm.

It follows from formula {1} that the closing lay length CL is 2.56 mm. At this lay length the gap between the intermediate filaments is closed. The final lay length with which core, intermediate layer filaments and outer layer filaments are twisted together in the final product is 10 mm. Hence the final lay length is between 2×CL i.e. 5.12 mm and 6×CL i.e. 15.36 mm.

This reinforcement strand turned out to be a large improvement to the multi strand cord 7×3×0.15 that is well known to reinforce synchronous belts. The latter is composed of 7 strands twisted together at a lay of 8 mm in S (alternatively Z) direction of which each strand consists of three filaments twisted together a 9 mm in Z direction (alternatively S). Note that both dW21 and 7×3×0.15 have the same number of filaments.

Table 1 shows a comparison of the main parameters of both:

TABLE 1

| Parameter | dW21 | 7 × 3 × 0.15 |
| --- | --- | --- |
| Diameter (mm) | 1.02 | 0.91 |
| Actual breaking load (N) | 1750 | 950 |
| Metallic cross section (mm$^2$) | 0.59 | 0.37 |
| Fill factor (%) | 72 | 57 |
| Axial stiffness between 2 to 10% of MBL (N/%) | 978 | 563 |
| Modulus in linear region (N/mm$^2$) | 187000 | 175000 |

With 'MBL' is meant the 'Minimum Breaking Load'. This is the lowest breaking load that can be expected based on 6-sigma statistical variations. For the purpose of this application it is set to 7% lower than the actual breaking load.

With 'Axial stiffness between 2 to 10% of MBL' (EA) is meant the ratio of load difference ΔF between 2 to 10% of the MBL (in N) divided by Δε the difference in elongation (in %) between these points. It is an important measure for the elongation in the working region of the reinforcement strand. In formula: ΔF=(EA)Δε.

The 'modulus in the linear region' is taken in a region of the load elongation curve that is linear e.g. in a region above 10% of the MBL.

When used in a belt such as an elevator belt or a synchronous belt the reinforcement strand according the invention shows the following advantageous features:

The strength per diameter is much higher, implying that for the same pitch of reinforcement cords in the belt, a much higher strength can be obtained! Indeed, the strength of the dW21 is almost the double compared to that of 7×3×0.15. This is due to the line contacts in the reinforcement strand rather than the point contacts in the multi strand cords. This also opens the possibility to use higher tensile strength filaments.

In the working region of the belt the axial stiffness is larger in the reinforcement strand compared to that of the multi strand cord. This is an important improvement in that the belt will elongate less for the same number of cords.

Much to the surprise of the inventors, the reinforcement strand did not show any core migration in extended tests in belts. Indeed, prior trials with belts comprising true Warrington strands in belts inevitably showed core migration.

The inventors attribute this to two major features:

The use of a core existing out of a 3×1 strand. The helical shape of the filaments accepts more compression than a single straight filament;

The presence of gaps in the intermediate layer allows the steel filaments present therein to take slightly different positions thereby absorbing compression without wicking out.

A particular comparison of a belt with a width 'W' of 25 mm and a thickness 't' of 5 mm with the inventive cord and the prior art cord can be found in Table 2:

TABLE 2

| Reinforcement | dW21 (invention) | 7 × 3 × 0.15 (prior art) |
| --- | --- | --- |
| Belt width (in mm) | 25 | 25 |
| Number of cords (number) | 16 | 16 |
| Pitch 'p' (in mm) | 1.56 | 1.56 |
| Diameter cord 'D' (in mm) | 1.02 | 0.91 |
| D/p (ratio) | 0.65 | 0.58 |
| Breaking load belt (in N) | 28000 | 15200 |
| Steel mass per area (kg/m$^2$) | 2.97 | 1.86 |

By using the inventive strand the breaking load of the belt increases with 84% while the steel mass per unit area only increases with 60%. The axial stiffness of the belt in the working region also increases due to the use of the inventive strand in combination with the increased steel mass.

Although the reinforcement strand dW21 does have some surface roughness due to the different second and third radii this surface roughness is much less than that of for example a 7×7 type of cord. While for a 7×7 cord the use of an adhesive is not absolutely necessary, it does turn out to be beneficial to use an organic primer to promote the adhesion between the reinforcement strand according the invention and the polymer jacket. For the described case an organo functional silane was used. It took 650 N to pull out a length of 12.5 mm of steel strand dW21 out of the belt. The adhesion force per unit length is thus 52 N/mm that is larger than 30 times the diameter of the reinforcement strand i.e. 39 N per mm of embedded strand.

Figure 3:
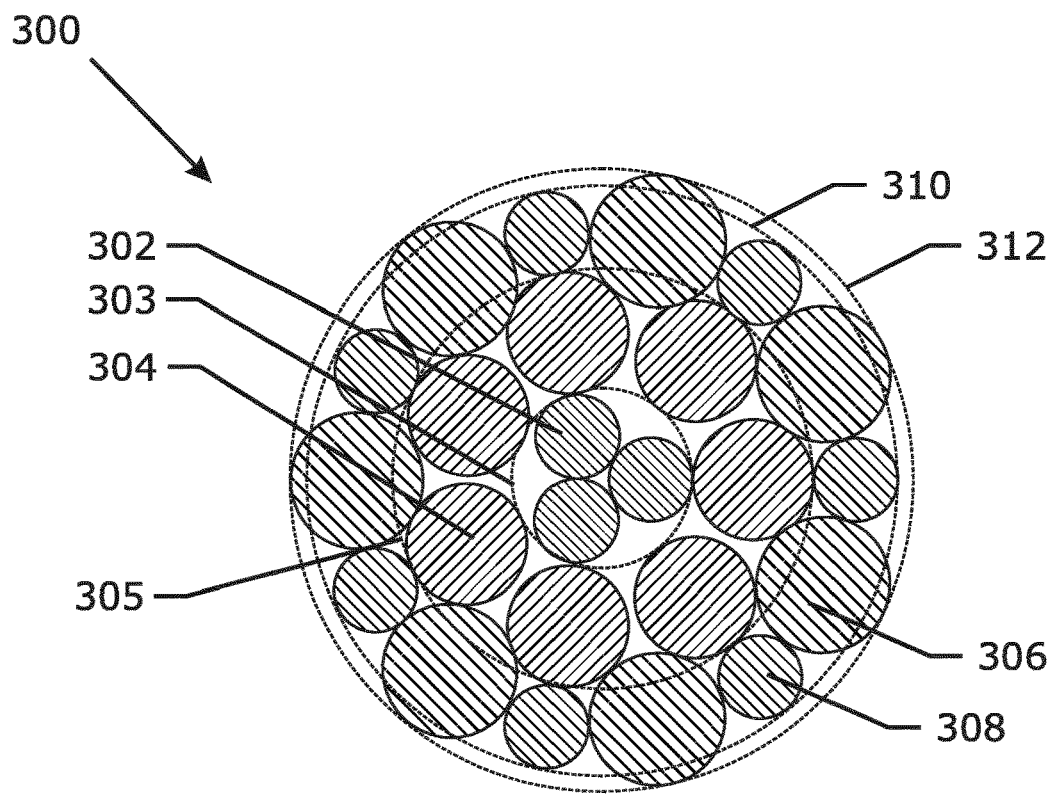
FIG. 3 shows the cross section of an alternative embodiment of the steel strand of the type 3+7+7|7 at final lay length that is particularly preferred to reinforce the inventive belt.

FIG. 3 shows another implementation 'dW24' of the steel strand 300 with N equal to 7. It is described by the following formula (brackets denote different twisting steps, numbers represent diameters of filaments in millimetre; subindices indicate laylength in mm and lay direction):

$$[(3\times0.18)_{5.6s}+7\times0.26+7\times0.285|0.18]_{15s}$$

The core 303 is a 3×1 strand of three 0.18 filaments 302 twisted together at lay 5.6 mm in 's' direction. Around the core 303 an intermediate layer of 7 steel filaments 304 with first diameter 0.260 mm is present. In the outer layer 0.285 mm filaments 306 alternate with 0.18 mm filaments 308. The mirror image is equally well possible (all lay directions reversed).

The important geometrical features are identified in the Table 3 below:

TABLE 3

| | |
| --- | --- |
| Core 303 diameter 'd$_0$' (μm) | 388 |
| First diameter 'd$_1$' 304 (μm) | 260 |
| N | 7 |
| Closing lay length CL (mm) | 4.46 |
| 2 × CL | 8.92 |
| 4 × CL | 17.84 |
| Final lay length FL (mm) | 15 |
| First radius 305 (μm) | 454 |
| Second radius 312 (μm) | 634 |
| Third radius 310 (μm) | 656 |
| Relative difference Second to Third radius (%) | 3.3 |
| Gap between filaments of outer layer (μm) | 1 |

The mechanical properties of this reinforcement strand are compared to that of a 7×7 construction of diameter 1.6 mm that is very popular to reinforce elevator belts (See U.S. Pat. No. 6,739,433): Table 4.

TABLE 4

| Parameter | dW24 | 7 × 7/1.6 |
|---|---|---|
| Diameter (mm) | 1.30 | 1.61 |
| Actual breaking load (N) | 3054 | 3200 |
| Metallic cross section (mm$^2$) | 1.07 | 1.30 |
| Fill factor (%) | 76 | 64 |
| Axial stiffness between 2 to 10% of MBL (N/%) | 1624 | 1250 |

Although the 7×7/1.6 has a larger diameter, the axial stiffness in the working region (2 to 10% of MBL) is lower than for the inventive reinforcement strand. The cord is in test and does not show core migration.

Figure 4:
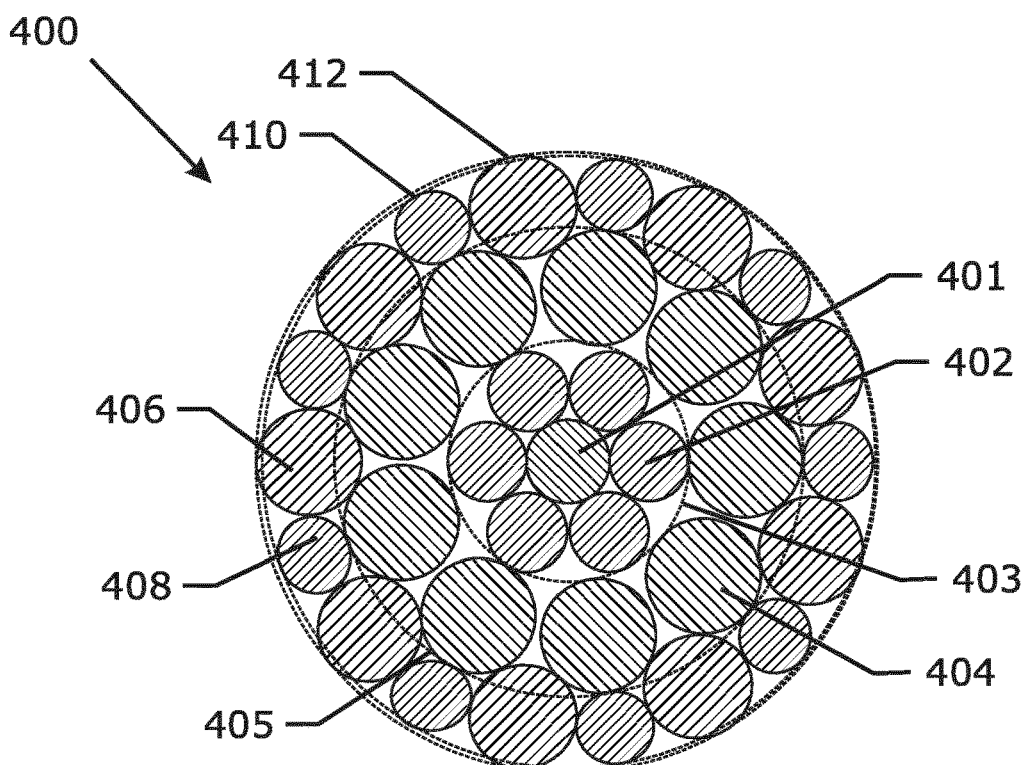
FIG. 4 shows the cross section of another alternative embodiment of the steel strand of the type (1+6)+7+7|7 that is particularly preferred to reinforce the inventive belt.

FIG. 4, Table 5 illustrates still another steel strand dW34 that can be used in the inventive belt of the following make:

$$[(0.24+6\times0.23)_{7.2z}+9\times0.33+9\times0.30|0.21]_{16.8z}$$

The formula should be read in the same way as with the previous example. The mirror image (all in 's' direction) will have equal properties.

TABLE 5

| | |
|---|---|
| Core 403 diameter 'd$_0$' (μm) | 700 |
| First diameter 404 'd$_1$' (μm) | 330 |
| N | 9 |
| Closing lay length CL (mm) | 8.14 |
| 2 × CL | 16.3 |
| 4 × CL | 32.6 |
| Final lay length FL (mm) | 16.8 |
| First radius 405 (μm) | 680 |
| Second radius (μm) 412 | 901 |
| Third radius (μm) 410 | 890 |
| Relative difference Second to Third radius (%) | 1.2 |
| Gap between filaments of outer layer (μm) | 4 |

A comparison of mechanical data to 7×7 of equal diameter 1.8 mm is shown in Table 6:

TABLE 6

| Parameter | dW34 (inv) | 7 × 7/1.8 (pa) |
|---|---|---|
| Diameter (mm) | 1.80 | 1.80 |
| Actual breaking load (N) | 5900 | 3965 |
| Metallic cross section (mm$^2$) | 2.01 | 1.54 |
| Fill factor (%) | 79 | 61 |
| Axial stiffness between 2 to 10% of MBL (N/%) | 2734 | 1570 |

For the same diameter of 1.80 mm a much higher breaking load is obtained. Also the axial stiffness in the working region of between 2 to 10% of the MBL is much higher. This results in an axially stiffer behavior in the region where the reinforcement is used i.e. in the working region of a belt.

Table 7 shows the comparison of two elevator belts reinforced with dW34 strand (dW34 (1) and dW34 (2)), compared to the commonly used 7×7/1.8 prior art ('pa') multistrand cord.

TABLE 7

| Reinforcement | dW34 (1) | dW34 (2) | 7 × 7/1.8 (pa) |
|---|---|---|---|
| Belt width (in mm) | 30 | 30 | 30 |
| Number of cords (number) | 10 | 12 | 10 |
| Pitch 'p' (in mm) | 3.0 | 2.5 | 3.0 |
| Diameter cord 'D' (in mm) | 1.8 | 1.8 | 1.8 |
| D/p (ratio) | 0.60 | 0.72 | 0.60 |

TABLE 7-continued

| Reinforcement | dW34 (1) | dW34 (2) | 7 × 7/1.8 (pa) |
|---|---|---|---|
| Breaking load belt (in N) | 59000 | 70800 | 39650 |
| Steel mass per area (kg/m$^2$) | 5.26 | 6.31 | 4.03 |

The first version of the inventive belt dW34 (1) is geometrically identical to the prior art belt 7×7×/1.8 (pa). The use of the dW34 reinforcement strands immediately results in an increase of belt breaking load of 49%, with only an increase in areal steel mass in the belt of 30%. The increased steel mass contributes to a higher axial stiffness in the working region.

When decreasing the pitch between strands—by going from 10 to 12 strands—the D/p ratio rises above 0.72: see column dW34 (2). The breaking load of the belt is then 79% higher than that of the prior art with only an increase in steel mass of 57%.

In order to reach the same belt breaking load of 70.8 kN with the prior art 7×7/1.8 construction, one would need an impossible D/p ratio of 1.08 i.e. the cords would be intersect one another.

When using an organic adhesive as the described organofunctional silane, an adhesion value of 120 N/mm could be reached which is well above 20×D of 36 N/mm and also above 30×D i.e. 54 N/mm.

In an alternative of the embodiment the dW34 embodiment (1+6) core is replaced with an equal lay construction of the following type:

$$[3\times0.18+3\times0.15|0.22|0.15)_{7.2z}+9\times0.33+9\times0.30| 0.21]_{16.8z}$$

Figure 5:
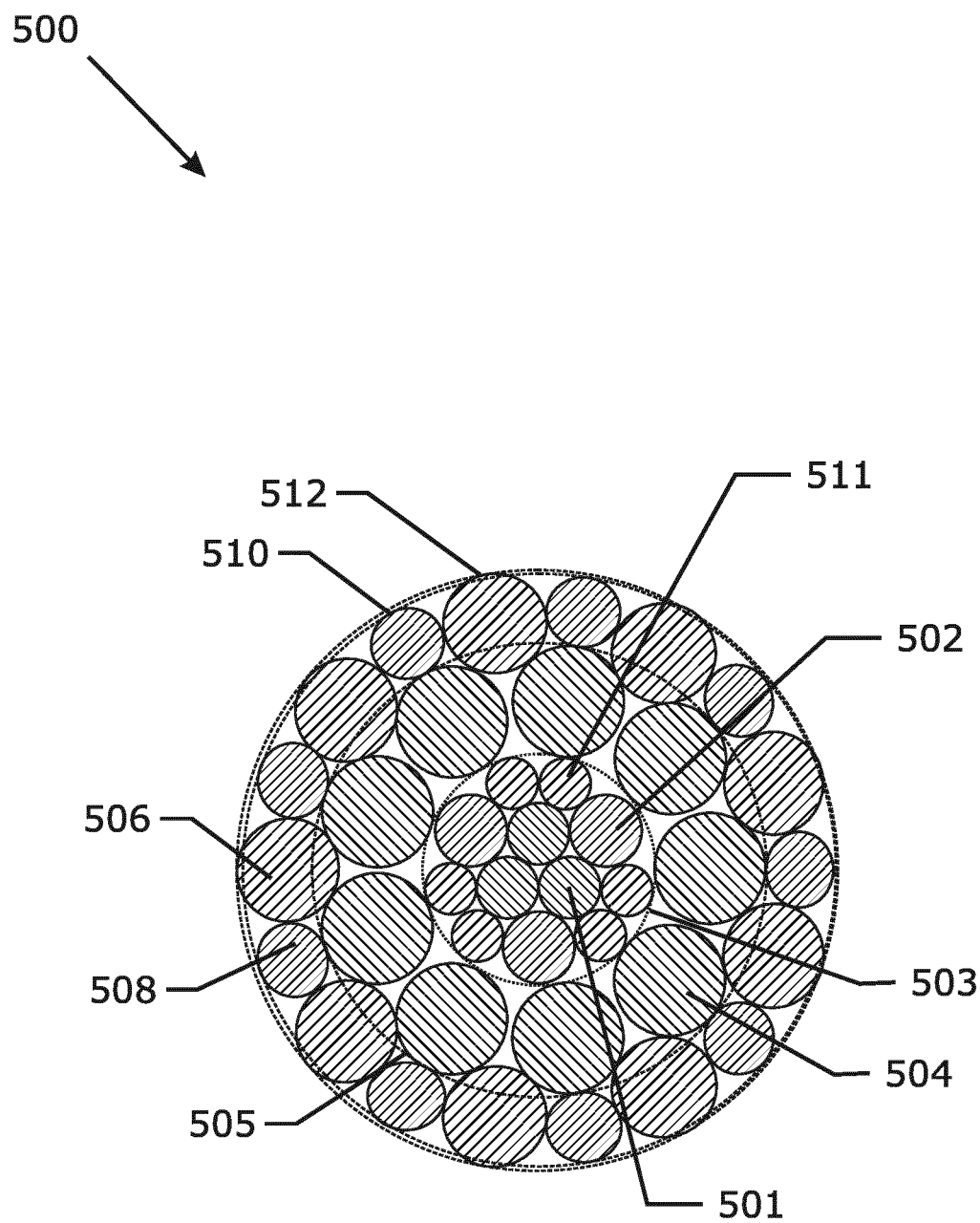
FIG. 5 shows a cross of an embodiment of a steel strand wherein the core is of an equal lay construction.

A cross section of the reinforcement strand with such a core is depicted in FIG. 5. The filaments of the outer layer are as in that of FIG. 4. Only the core is different. The core-core is formed by three filaments 501 of diameter 0.18. The notation 3×0.15|0.22|015 indicates that the outer layer of the core is formed of three groups of each time three filaments: one middle filament of larger size (0.22 mm, indicated 502) that has two neighboring filaments of smaller diameter (0.15 mm, indicated 511). This results in a fairly round core 503 of diameter 0.70 mm.

In all of the above examples the wires are hot dip galvanized with a coating weight of 5 gram per kilogram of strand.

A synchronous belt is built up in much the same way as the belt 100 except that one side of the belt is provided with teeth for engagement with toothed pulley.

The invention claimed is:

1. A belt comprising a plurality of steel strands and a polymer jacket, said belt having a length dimension, a width dimension and a thickness dimension, said steel strands having steel strand centres, said steel strands being oriented along the length dimension and held in parallel relationship by said polymer jacket, wherein said steel strand centres are aligned in the width dimension and wherein neighbouring steel strand centres are separated by a pitch, wherein said steel strands have an equal steel strand diameter, wherein the ratio of said steel strand diameter to said pitch is larger than 0.55, wherein each one of said steel strands comprises a core having a core diameter and each one of said steel strands comprises steel filaments, said steel filaments being organised in an intermediate layer comprising N first steel filaments circumferentially arranged around said core, said first steel filaments having a first diameter, said core diameter and said first diameter being such that a gap forms between said first steel filaments, and an outer layer comprising 2N steel filaments circumferentially arranged around said intermediate layer, wherein said steel filaments of said intermediate layer and said steel filaments of said outer layer are twisted around said core with the same final lay length and direction and wherein said final lay length is larger than two times and smaller than six times the closing lay length, said closing lay length being that lay length at which a gap between said first steel filaments of the intermediate layer is closed.

2. The belt according to claim 1 wherein said steel strands are provided with an organic primer that promotes adhesion between the steel strands and the polymer of said polymer jacket.

3. The belt according to claim 2 wherein said organic primer is selected from the group consisting of organo functional silanes, organo functional zirconates, and organo functional titanates.

4. The belt according to claim 2 wherein said steel strands adhere to said polymer jacket with an adhesion axial force per unit length in newton per millimetre that is at least 20 times the steel strand diameter in mm.

5. The belt according to claim 1 wherein there is no gap between the steel filaments of the outer layer of each one of said steel strands.

6. The belt according to claim 1 wherein said outer layer of each one of said steel strands comprises N second steel filaments of a second diameter, said N second steel filaments being tangent to a second circumscribing circle having a second radius and N third steel filaments of a third diameter, said N third steel filaments being tangent to a third circumscribing circle having a third radius said second diameter being larger than said third diameter, said second steel filaments and said third filaments occupy alternating positions in said outer layer, and wherein the second radius is different from the third radius.

7. The belt according to claim 6 wherein the second radius of each one of the steel strands is larger than the third radius.

8. The belt according to claim 1 wherein in each one of said steel strands the number N is equal to 5, 6, 7, 8 or 9.

9. The belt according to claim 1 wherein said core of each one of said steel strands is a single steel filament comprising bends with straight segments in between.

10. The belt according to claim 1 wherein said core of each one of said steel strands is an equal lay strand of core steel filaments free from zero order helical deformations and twisted together with a core lay length different from the final lay length of each of said steel strands.

11. The belt according to claim 10 wherein the number of said core steel filaments is two or three or four and said core steel filaments have an equal diameter.

12. The belt according to claim 10 wherein the number of said core steel filaments is nine or twelve and wherein said core steel filaments are arranged in a semi-Warrington construction.

13. The belt according to claim 1 wherein the core of each one of said steel strands is a strand comprising a core-core and 5, 6 or 7 core outer steel filaments twisted around said core-core with a core lay length different from the final lay length in each of said steel strands.

14. The belt according to claim 1 wherein said steel filaments of each one of said steel strands are provided with a metallic coating or metallic coating alloy.

* * * * *